United States Patent
Popovic et al.

(10) Patent No.: US 7,817,797 B2
(45) Date of Patent: Oct. 19, 2010

(54) METHOD AND APPARATUS FOR DETECTING ECHO PATH CHANGES IN AN ACOUSTIC ECHO CANCELLER

(75) Inventors: Mirjana Popovic, Ottawa (CA); Dieter Schulz, Dunrobin (CA); Dean Swan, Canton, NY (US); Andrew Wu, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1137 days.

(21) Appl. No.: 11/422,747

(22) Filed: Jun. 7, 2006

(65) Prior Publication Data

US 2007/0286404 A1 Dec. 13, 2007

(51) Int. Cl.
 *H04M 9/08* (2006.01)
(52) U.S. Cl. ............. 379/406.08; 379/3; 379/406.01; 381/71.1
(58) Field of Classification Search .................. 379/406.01–406.16
See application file for complete search history.

(56) References Cited

U.S. PATENT DOCUMENTS

| | | | |
|---|---|---|---|
| 3,787,645 A * | 1/1974 | Ochiai et al. | 379/406.11 |
| 5,136,577 A * | 8/1992 | Amano et al. | 370/289 |
| 5,463,618 A * | 10/1995 | Furukawa et al. | 370/290 |
| 5,539,731 A * | 7/1996 | Haneda et al. | 370/286 |
| 6,035,034 A | 3/2000 | Trump | |
| 6,226,380 B1 | 5/2001 | Ding | |
| 6,516,050 B1 * | 2/2003 | Tasaki et al. | 379/3 |
| 6,768,723 B1 | 7/2004 | Popovic et al. | |

2003/0219113 A1  11/2003  Bershad et al.

FOREIGN PATENT DOCUMENTS

| | | |
|---|---|---|
| CA | 2451417 A1 | 5/2004 |
| CA | 2494500 A1 | 7/2005 |
| EP | 1 424 846 A2 | 6/2004 |

OTHER PUBLICATIONS

S. Kim, "Applying an Auxiliary Filter in the Adaptive Echo Canceller for . . . Double-Talk Detection" School of EEE, Kyungpook National University; May 2, 2002: p. 207-210.
A. Mader, "Step-size control for acoustic echo cancellation filters-an overview" Darmstadt University of Technology; Signal Processing Feb. 11, 2000 p. 1697-1719.

* cited by examiner

*Primary Examiner*—Fan Tsang
*Assistant Examiner*—Ibraham Sharifzada

(57) ABSTRACT

An echo canceller comprising a first adaptive filter having N_long coefficients for converging to an echo path, a non-adaptive filter representing a direct echo path portion captured by the first adaptive filter and having N_short default coefficients, where N_long>N_short, for quick convergence of the echo canceller at start-up, wherein the default coefficients are replaced by the first N_short coefficients from the first adaptive filter responsive to an improvement in echo return loss enhancement (ERLE) of the first adaptive filter, a second adaptive filter having N_short default coefficients for modeling the direct echo path and providing an indication of double-talk and echo path changes, decision logic for receiving error signal outputs from the first and second adaptive filters and the non-adaptive filter and in response distinguishing between echo path changes and double-talk, and a non-linear processor for attenuating signals responsive to input from the decision logic.

8 Claims, 3 Drawing Sheets

METHOD AND APPARATUS FOR DETECTING ECHO PATH CHANGES IN AN ACOUSTIC ECHO CANCELLER

BACKGROUND OF THE INVENTION

1. Field of the Invention

The present invention relates generally to detection of echo path changes in echo cancellers, and more particularly to detect the echo path change (EPC) in a full duplex handsfree (FDHF) speakerphone and to mask the increased error due to the echo path change.

2. Description of the Related Art

Two types of echoes are prevalent in modern communication system: line echo and acoustic echo. Line echo arises at a four- to two-wire interface, or "hybrid", whereas acoustic echo occurs when sound from the telephone handsfree speaker feeds back to the microphone either directly or is reflected off of different surfaces, such as walls, tables, etc. Hybrid echo is created as voice signals are transmitted across the network via the hybrid connection at the two-wire/four-wire public-switched telephone network PSTN conversion points.

The actual amount of signal that is reflected back depends on many factors including the size of the room, the "hardness" of materials that the speaker signal reflects off of, the loudness of the speaker signal, and the distance between the speaker and microphone. The majority of echo is due to the speaker signal being picked up directly by the microphone.

The parameter for defining the effectiveness of the echo attenuation is echo-return loss (ERL). A high ERL indicates a low reflected-signal back to the talker and vice versa.

The effective removal of echo is one key to maintaining and improving perceived voice quality on a call. This has led to intensive research into the area of echo cancellation, with the aim of providing echo cancellers that can reduce acoustic echo, thereby improving overall speech quality. The measure of an echo canceller's ability to remove echo is ERL enhancement (ERLE). To completely remove the echo from the circuit, echo cancellation creates a model of the echo path, synthesizes a replica estimate of the echo, and cancels the echo by subtracting the estimated echo from the true echo. This process allows full-duplex speech between the near and distant callers and results in natural, interactive speech.

Typically, a nonlinear processor (NLP) is activated when the echo canceller has determined that there is no near-end speech, which results in full attenuation of all speech signals (real near-end speech and echo from the far end of the conversation).

It is known in the art to employ adaptive filtering within echo cancellers. In an adaptive filter, the filter coefficients are based, in part, on feedback of filter output. Normalized Least Mean Square (NLMS) adaptive filtering is one method, popular in echo cancellation, to address reflections in the telephony system.

In such echo cancellers, the coefficients of an adaptive filter converge to a certain echo path. Under ideal conditions, a generally acceptable convergence time requires that the echo canceller achieve 27 dB of ERLE (Echo Return Loss Enhancement) in 0.5 sec. Once the coefficients are converged, the echo is cancelled from the input signal. When the echo path changes (i.e. call transfer, conferencing, or a telephone user touching the phone display or keys while a handsfree call is in progress), the echo canceller has to quickly re-converge to the new echo path or else the echo will be perceived by the user. Line echo path changes are infrequent and last a relatively long time. Acoustic echo path changes are more frequent and relatively short in duration. After an acoustic echo path change, the echo path usually returns to the previous state (i.e. after the user stops touching the touchscreen LCD or pushing a button, the echo path is the same as before the user touched the screen or pushed a button).

Consequently, it is known in the art to preserve essential information on the constant portion of the acoustic echo path (or the acoustic feedback through the plastic housing of a telephone) as default coefficients for use at start-up to quickly converge the echo canceller. Examples of this technique are set forth in U.S. Pat. No. 6,768,723 and published Canadian Patent Application 2,451,417. As disclosed in the foregoing prior art, two filters are utilized. The first, a "short" fitter, uses non-adaptive default coefficients (N_short coefficients) to preserve the information of the captured constant echo path. The second, a "long" fitter, uses adaptive filter coefficients (N_long coefficients) for adapting constantly toward the best solution for a current echo path (where N_long>N_short). Each time the convergence of the long filter improves, the first N_short coefficients from the long filter are transferred to the short filter to replace the default coefficients.

Detecting the echo path changes is a difficult problem since the echo resulting from a new echo path and the echo generated by the old echo path from the converged adaptive filter can easily be misinterpreted as double talk.

Prior art solutions to this problem may be found in U.S. Pat. No. 6,035,034 (Trump, Tonu): Double talk and Echo Path Change Detection in a Telephony System, and U.S. Pat. No. 6,226,380 (Heping, Ding): Method of Distinguishing Between Echo Path Change and Double Talk Conditions in an Echo Canceller.

In addressing the foregoing problems, published Canadian patent application no. 2,494,500, sets forth a method for detecting echo path changes that uses the statistics of the echo cancelling behaviour (i.e. signal and performance information), to distinguish between new line and double talk conditions. In terms of speech dynamics, double talk conditions are relatively short in duration, whereas a new line condition remains active. Using a moving counter (referred to in CA 2,494,500 as an Echo Path Change Counter or EPC Counter), an evaluation is made of the probability that the echo canceller behaviour is responding to an echo path change and not a double talk scenario. By monitoring the ERL (Echo Return Loss), ERLE (Echo Return Loss Enhancement), noise levels and signal energies, the Echo Path Change Counter is incremented or decremented. When the counter reaches a predetermined threshold value indicative of sustained poor echo performance, a determination is made that there is a probable new line condition. This echo path change information is then passed to the echo canceller to enable re-convergence.

SUMMARY OF THE INVENTION

According to one aspect of present invention, an additional short adaptive filter is provided of the same length as the default filter in CA 2,494,500. This length covers only the direct echo path of the phone, which is sufficient for most applications (i.e. based on the typical echo path change scenario in which a phone user presses the keypad or touches the LCD screen of the phone, causing a change of the echo path in the direct echo path only). The short adaptive filter adapts very quickly whenever the reference signal is present. However, rather than providing echo cancellation, the output of this additional short filter feeds an Echo Path Change (EPC) detector which, in response, (1) quickly determines any increase in residue echo/error, (2) distinguishes the NLMS divergence due to the echo path change from the divergence due to double talk (i.e. near-end speech is present), and (3) applies the NLP on the residual echo whenever an echo path change is detected.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
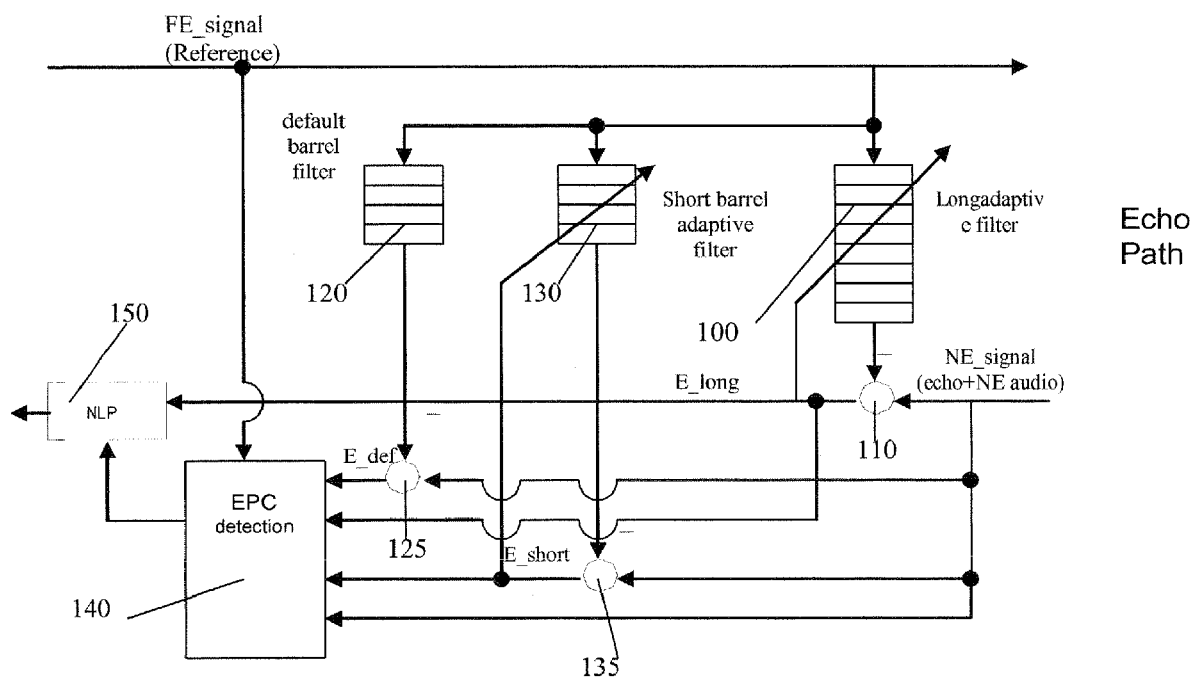
FIG. 1 is a block diagram showing an echo canceller with echo change detection, according to an embodiment of the invention.

With reference to FIG. 1, FIG. 1 an adaptive echo canceller is shown according an embodiment of the invention. A reference signal (FE_signal) is applied as an input to the echo canceller and to the acoustic echo path (i.e. the signal is broadcast via a telephone speaker). The echo path gives rise to an Echo Return Loss (ERL), which is a measure of the actual amount of reflected signal. A high ERL indicates only a relatively small signal reflected back to the talker, and vice versa, as discussed above. An adaptive filter (long filter 100) models an estimation of the echo introduced by the echo path using the well known NLMS algorithm (although other adaptive algorithms may be used), and subtracts the echo signal from the near-end input signal (i.e. NE_signal received via a telephone microphone) which contains the undesirable echo, via a first subtractor 110. Provided that the transfer function of the model of the echo path provided by adaptive filter 100 is identical to the transfer function of the echo path, the error signal becomes zero and the filter converges to the correct transfer function, resulting in perfect echo cancellation. The number of coefficients used in the long filter 100 defines its length (Length=N_long, representing the estimated echo path length).

A short default coefficients filter 120 (Default_Length=N, number of coefficients representing the estimated length of the direct echo path) represents the direct echo path captured by the long adaptive filter 100. Filter 120 is non-adaptive such that it does not track echo path changes and also does not diverge during double-talk, as is known from published Canadian Patent Application 2,451,417, referred to herein above. Subtractor 125 outputs an error signal resulting from echo cancellation via filter 120.

According to an aspect of the invention, a further short adaptive filter 130 (Short_Length=Default_Length) is provided for modeling only the direct echo path and adapting quickly whenever a reference signal is present. This is in contrast with filter 100 which adapts slowly when the reference signal is present. The filter 130 is not used for echo cancellation, but only for echo path detection. Specifically, the filter 130 quickly diverges during double-talk and is able to provide an early indication of any echo path changes. A subtractor 135 outputs an error signal resulting from filter 130.

Decision logic 140 distinguishes between echo path changes and double-talk based on the reference signal and the estimated error signals from all three filters 100, 120 and 130, as discussed in greater detail below. Finally, a non-linear processor 150 (NLP) is provided.

Applying the short adaptive filter 130 to the major (direct) echo path changes minimizes the impact on normal FDHF (Full Duplex Hands Free) behavior. Typically, in FDHF applications, the direct echo path reflection is the major contributor to the echo. Since the secondary echo path changes are much smaller due to attenuation in the room, their impact on FDHF performance is not critical such that NLP 150 is capable of handling them.

One difference between non-adaptive default filter 120 and the short adaptive filter 130 is that filter 130 adapts whenever the reference signal (FE_signal) is present, whereas the default filter 120 statically models the previously captured echo path and never adapts. On the other hand, a difference between the short and long adaptive filters 130 and 100 is that the short filter 130 is an under modeled system (i.e. the short adaptive filter 130 only covers the direct echo path, and never converges as deeply as the long NLMS filter 100 when it is in the stable/converged state, or when there is no echo path change). Therefore, in a single talk scenario a measurable difference will exist in the ERLE between short and long adaptive filters 130 and 100 (i.e. the long filter 100 performs better than the short filter 130). By monitoring the difference between the two error energies from filters 100 and 130 the EPC detector logic 140 indicates a change of state from single talk to one of either an echo path change (EPC) or double talk (DT).

During an echo path change the short adaptive filter 130 converges more quickly to the new echo path than the long adaptive filter 100, as discussed above. Consequently the difference between the two error signals output from filters 100 and 130 will be small or even negative, as the short filter 130 becomes better converged than filter 100.

Figure 2:
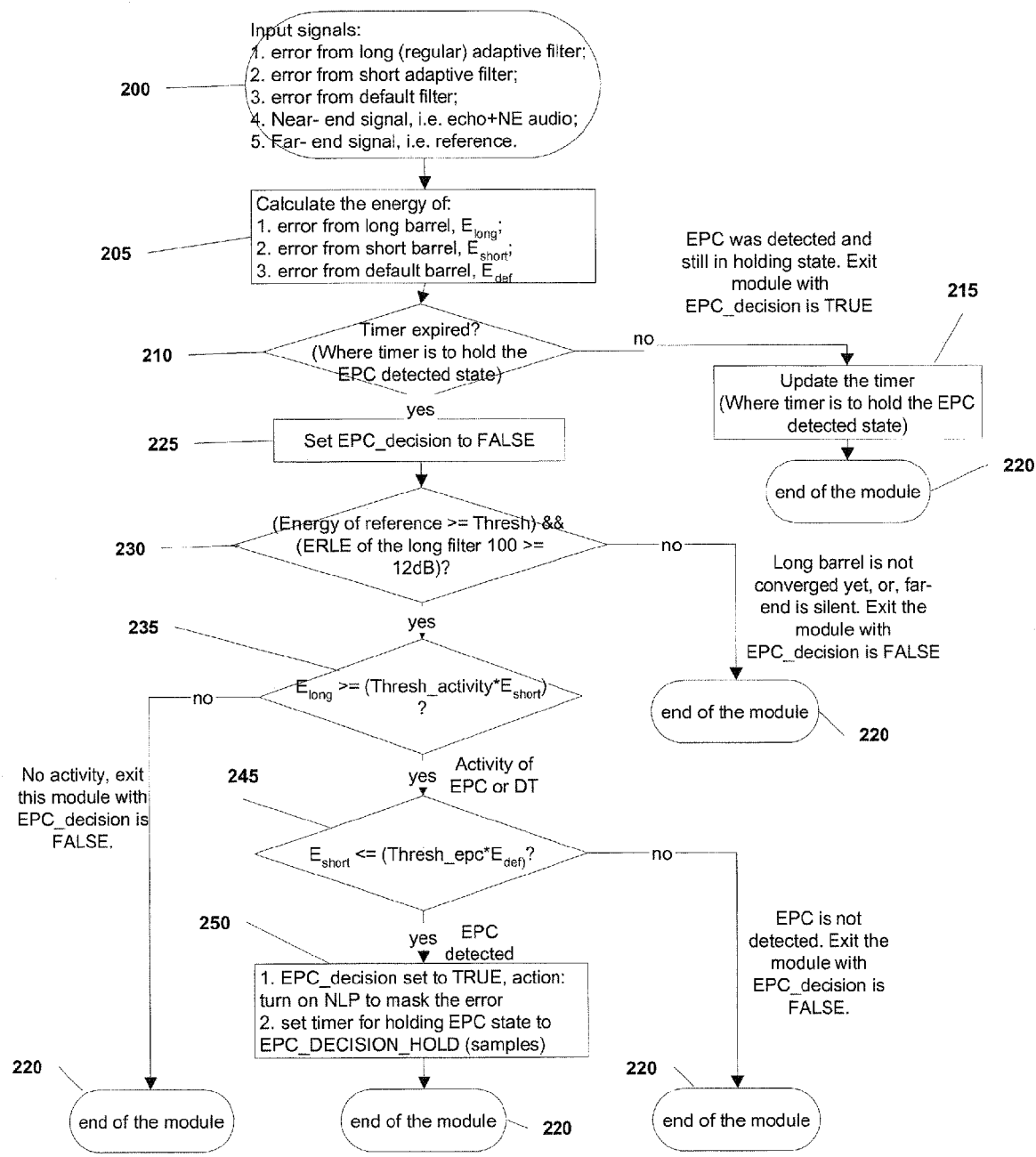
FIG. 2 is a flowchart showing method steps for detecting echo path changes according to an embodiment of the invention.

Turning to FIG. 2, operation of the EPC detection logic 140 is shown according to an aspect of the invention. First, the reference signal (FE_signal) and error signals from subtractors 110, 125 and 135 are applied as inputs to EPC detection logic 140 (step 200). EPC detection logic 140 then calculates (step 205) the energies of the error signals output from filter 100 ($E_{long}$), filter 120 ($E_{def}$) and filter 130 ($E_{short}$).

An EPC timer is set to a predetermined value (EPC_DECISION_HOLD) whenever an echo path change (EPC) is detected, as in step 250. The EPC detection logic 140 remains in an EPC detected state until this timer expires. The NLP 150 remains turned on such that the echo is masked, during the time between when the EPC is detected (the timer is set) and the timer has expired. The value EPC_DECISION_HOLD is used to hold the EPC detected state. In a successful prototype, the constant was chosen to be 600 samples (i.e. or 75 ms).

In the event the state hold timer has expired at step 210 (either expired, or never set since it last expired), the EPC_decision is set to FALSE (step 225). This makes sure that the default-state of the EPC detection logic 140 is one in which no echo path change has been detected.

Next, at step 230, a determination is made as to whether the reference signal is present (i.e. the energy of the reference signal exceeds a Threshold (e.g. −32 dBmo) and the measured ERLE of the long filter 100 exceeds a predetermined value (e.g. 12 dB). If either of these conditions fails, the algorithm exits (step 220), indicating either an absence of echo or that the algorithm has not yet converged, such that there no good condition to decide about the echo path change.

In the event of a "Yes" decision at step 230, a determination is made (step 235) as to whether $E_{long} \geq$ (Thresh_activity*$E_{short}$), where Thresh_activity is a threshold of, for example, −6 dB in a successful implementation of an embodiment of the invention. This condition is based on the fact that the long filter 100 cancels echo much better than short filter 130 in a stable/converged single-talk scenario. However, in either a double talk or EPC scenario the long filter 100 does not achieve as good ERLE as in the stable/converged single-talk state. This makes the relation between long filter 100 and short filter 130 change significantly so that the long filter 100 does not achieve 6 dB better than the short filter 130. A "No" event at step 235 indicates there is no double talk or EPC. The algorithm exits (step 220).

In the event of a "Yes" decision at step 235, a determination is made (step 245) as to whether $E_{short} \leq$ (Thresh_epc*$E_{def}$), where Thresh_epc is a threshold of, for example, −5 dB in a successful implementation of an embodiment of the invention. This condition is based on the fact that the short filter 130 will quickly adapt to the new echo path while the default filter 120 does not. In the event of an echo path change the short filter 130 achieves better ERLE than the default filter 120, by, e.g. 5 dB. A "No" event at step 245 indicates that the activity detected from step 235 is not for EPC. The algorithm exits (step 220).

In the event of a "Yes" decision at step 245, then at step 250 the EPC_decision is set to TRUE and an Echo Path Change (EPC) is detected. As described above, this state will be held for at least EPC_DECISION_HOLD samples (e.g. 600 samples). and the NLP 150 is set to mask the error (i.e. provide full attenuation of the signal), and the algorithm ends (step 220). Alternatively, rather than control the NLP 150 for masking unwanted echo due to echo path changes, the EPC detection logic 140 may be used to control the NLMS adaptation. Specifically, the EPC detection logic 140 may be used to freeze or slow down the adaptation of the long filter 100 when double-talk is detected and to speed up the adaptation of the long filter when an echo path change (EPC) is detected.

Figure 3:
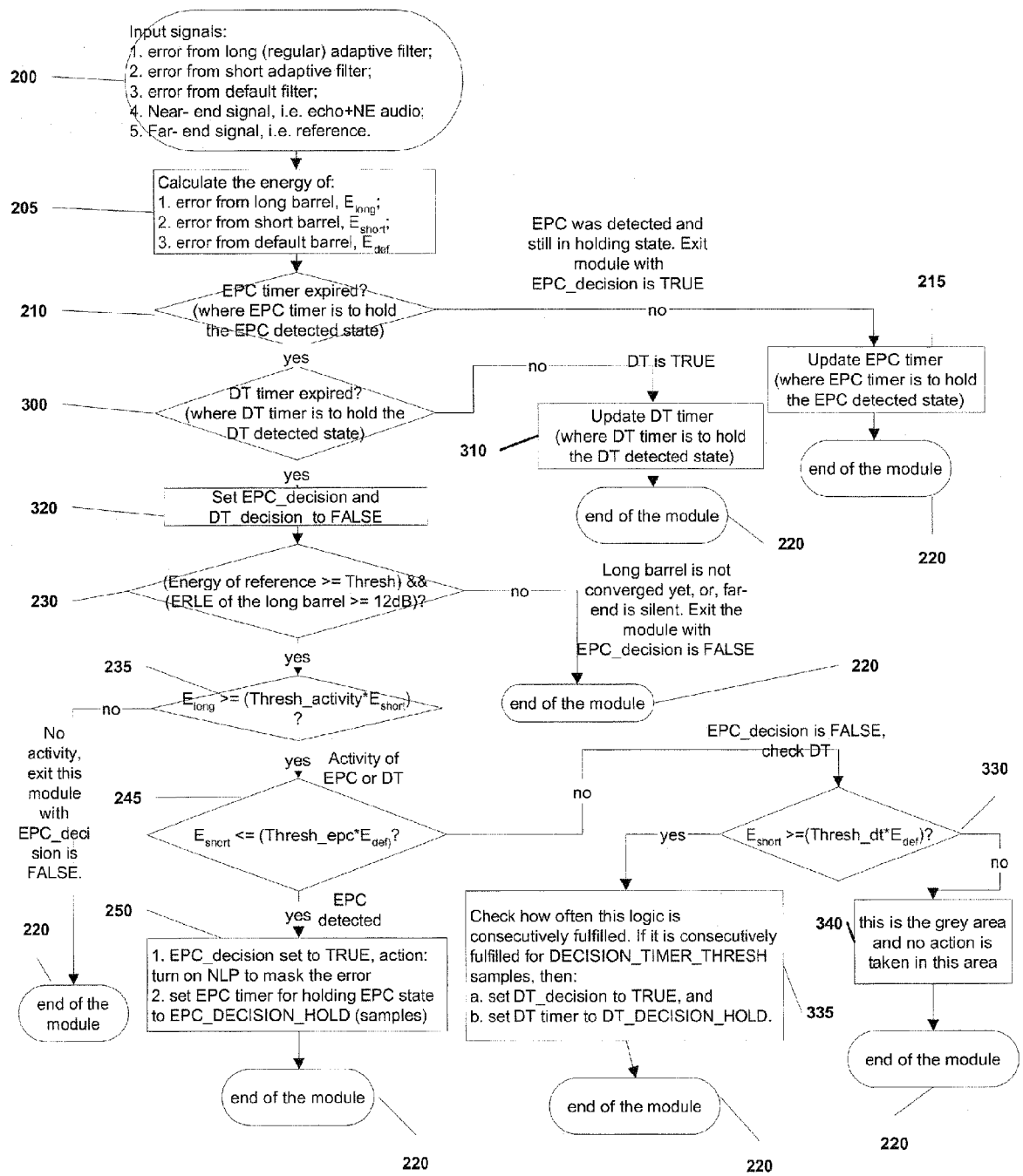
FIG. 3 is a flowchart showing the method steps of FIG. 2 for method steps for detecting echo path changes and further steps for detecting double-talk, according to an alternative embodiment.

As shown in FIG. 3, analysis of the behavior between the fixed filter 120 and the short adaptive filter 130 may be used to determine when a double talk state is entered into. The EPC steps of FIG. 3 are identical to the steps of FIG. 2, and identical reference numerals are used to denote equivalent steps. After common step 210, the DT algorithm determines whether a DT timer has not yet expired, then double talk is detected whereupon a flag (DT_decision) is set to TRUE, The DT timer is updated at step 310 and the algorithm ends (step 220).

In a double talk scenario the default coefficients continue to be valid and may be used to cancel the echo signal. The short adaptive filter 130, on the other hand, updates its coefficients based on the NE_signal (echo+near-end speech) and thus causes a divergence of the coefficients. If the adaptive filter error is consistently worse relative to the fixed filter error over a period of time a double talk condition is identified.

During double talk, the near-end (NE) speech contributes to the residue echo. That is:

Echo=Real_Echo+NE_Speech; and

Energy_residue_echo=Energy_of_Echo−Estimated echo of the NLMS filter 100.

The presence of the near-end signal results in a decrease of ERLE for both long and short adaptive filters 100 and 130, so that the ratio of the error energies between the two filters can no longer achieve the aforementioned measurable difference (i.e. the difference, in dB, between the two filters in the single talk scenario). By monitoring the difference between the two error energies the EPC detector logic 140 is able to identify one of either an echo path change (as discussed above in connection with FIG. 2) or a double-talk condition. In particular, whenever the error energy ratio between filters 100 and 130 is greater than Thresh_activity (e.g. −6 dB) then there is some activity (either DT or EPC), per a "Yes" decision at step 235. Further processing at steps 330, 335 and 340 distinguishes between DT and EPC. Thus, at step 245, the error of the default non-adaptive (fixed) filter 120 and the error of the short adaptive filter 130 are compared.

During an echo path change, the default coefficients in the fixed filter 120 are no longer valid, while the short adaptive filter 130 converges to the new echo path change. Consequently, the error from the short adaptive filter 130 becomes much smaller than the error from the default fixed filter 120. Therefore, when the error energy ratio between the adaptive filter 130 and fixed filter 120 is less than Thresh epc, (e.g. −5 dB) an echo path change is flagged, as discussed above in connection with FIG. 2.

On the other hand, if $E_{short} \leq$ (Thresh_epc*$E_{def}$) is not true, then the EPC_decision is set to FALSE and a further determination is made (step 330) as to whether $E_{short} \geq$ (Thresh_dt*$E_{def}$), where Thresh_dt is +1 dB according to a successful prototype of the invention. To make a reliable decision for double talk this condition has to be consecutively fulfilled for at least DECISION_TIMER_THRESH times. The DECISION_TIMER_THRESH is chosen for 16 samples, according to a successful prototype. If a double talk state is finally detected this state will at least be held for DT_DECISION_HOLD samples. To hold the DT state a DT_hold_timer is set to DT_DECISION_HOLD. The timer is checked at step 300 and updated at step 310 if necessary.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. An echo canceller for cancelling echo from a near-end signal, comprising:

a first adaptive filter having N_long coefficients for converging to an echo path of said near-end signal and for adapting slowly when a reference signal is present;

a non-adaptive filter representing a direct echo path portion of said echo path and having N_short default coefficients, where N_long>N_short, for quick convergence of said echo canceller at start-up, said default coefficients being replaced by the first N_short coefficients from said first adaptive filter responsive to an improvement in echo return loss enhancement (ERLE) of said first adaptive filter;

a second adaptive filter having N_short default coefficients for modeling said direct echo path and for adapting quickly when said reference signal is present, said second adaptive filter used only for echo path detection;

decision logic connected to said first and second adaptive filters of said non-adaptive filter for detecting and distinguishing between an echo path change and a state of double-talk by (i) calculating respective energy levels of signals output from said first and second adaptive filters and said non-adaptive filter, (ii) in the event the signal energy ratio between said first and second adaptive filters is equal or greater than a first threshold then indicating one of either said echo path change and said double-talk, and (iii) in the event the signal energy ratio between said second adaptive filter and said non-adaptive filter is equal or less than a second threshold then indicating said echo path change, or (iv) in the event the signal energy ratio between said second adaptive filter and said non-adaptive filter is greater than said second threshold and equal or greater than a third threshold then indicating said double talk; and a non-linear processor responsive to said echo path change being detected by said decision logic for attenuating said near-end signal.

2. The echo canceller of claim 1, wherein said first threshold is approximately −6 dB and said second threshold is approximately −5 dB.

3. The echo canceller of claim 1, wherein said first threshold is approximately −6 dB, said second threshold is approximately −5 dB, and said third threshold is approximately +1 dB.

4. A method of cancelling echo from a near-end signal, comprising:

filtering said near-end signal according to a first adaptive filter having N_long coefficients for converging to an echo path of said near-end signal;

filtering said near-end signal according a non-adaptive filter representing a direct echo path portion of said echo path and having N_short default coefficients, where N_long>N_short, for quick convergence of said echo canceller at start-up, said default coefficients being replaced by the first N_short coefficients from said first adaptive filter responsive to an improvement in echo return loss enhancement (ERLE) of said first adaptive filter;

filtering said near-end signal according a second adaptive filter having N_short default coefficients for modeling said direct echo path, said second adaptive filter used only for echo path detection;

detecting and distinguishing between an echo path change and double-talk by (i) calculating respective energy levels of signals output from said first and second adaptive filters and said non-adaptive filter, (ii) in the event the signal energy ratio between said first and second adaptive filters is equal or greater than a first threshold then indicating one of either said echo path change and double-talk, and (iii) in the event the signal energy ratio between said second adaptive filter and said non-adaptive filter is equal or less than a second threshold then indicating said echo path change, or (iv) in the event the signal energy ratio between said second adaptive filter and said non-adaptive filter is greater than said second threshold and equal or greater than a third threshold then indicating said double talk; and responsive to said echo path change being detected then attenuating said near-end signal.

5. The method of claim 4, wherein said first threshold is approximately −6 dB and said second threshold is approximately −5 dB.

6. The method of claim 4, wherein said first threshold is approximately −6 dB said second threshold is approximately −5 dB, and said third threshold is approximately +1 dB.

7. The echo canceller of claim 1, further comprising a timer for causing said decision logic to continue attenuating said near-end signal for a time period responsive to initial detection of said echo path change irrespective of fluctuations in said energy levels of signals output from said first and second adaptive fitters and said non-adaptive filter.

8. The method of claim 4, further comprising continuing attenuation of said near-end signal for a time period responsive to initial detection of said echo path change irrespective of fluctuations in said energy levels of signals output from said first and second adaptive filters and said non-adaptive fitter.

* * * * *